US009834131B2

(12) United States Patent
Tamura

(10) Patent No.: US 9,834,131 B2
(45) Date of Patent: Dec. 5, 2017

(54) INFORMATION PROVISION DEVICE FOR VEHICLE

(71) Applicant: Nippon Seiki Co., Ltd., Niigata (JP)

(72) Inventor: Shigeaki Tamura, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/765,302

(22) PCT Filed: Jan. 20, 2014

(86) PCT No.: PCT/JP2014/050932
§ 371 (c)(1),
(2) Date: Jul. 31, 2015

(87) PCT Pub. No.: WO2014/119408
PCT Pub. Date: Aug. 7, 2014

(65) Prior Publication Data
US 2016/0001693 A1 Jan. 7, 2016

(30) Foreign Application Priority Data

Feb. 1, 2013 (JP) .................................. 2013-018120

(51) Int. Cl.
*B60Q 1/00* (2006.01)
*G09G 5/14* (2006.01)
(Continued)

(52) U.S. Cl.
CPC .......... *B60Q 1/00* (2013.01); *G01C 21/3626* (2013.01); *G01C 21/3632* (2013.01);
(Continued)

(58) Field of Classification Search
CPC .. B60Q 1/00; G01C 21/3632; G01C 21/3697; G06T 3/40; G09G 2320/0613;
(Continued)

(56) References Cited

U.S. PATENT DOCUMENTS 5,757,268 A 5/1998 Toffolo et al.
5,764,139 A * 6/1998 Nojima ................ G07C 5/0825
340/438

(Continued)

FOREIGN PATENT DOCUMENTS

JP 9-123848 A 5/1997
JP 2001-022482 A 1/2001
(Continued)

OTHER PUBLICATIONS

Machine translation of applicant submitted JP2009281991 published Dec. 3, 2009 (11 pages).*
(Continued)

*Primary Examiner* — Quan-Zhen Wang
*Assistant Examiner* — Rajsheed Black-Childress
(74) *Attorney, Agent, or Firm* — McDermott Will & Emery LLP

(57) ABSTRACT

An information provision device for a vehicle allows information to be provided to a user appropriately, and includes an onboard device having a first control means that operates a display unit, and an external device having a second control means that outputs information from outside the vehicle to the first control means. The display unit includes a first region in which vehicle-status information is displayed and a second region in which the information from outside the vehicle is displayed. The first control means can determine priorities for the vehicle-status information and the information from outside the vehicle. The first control means operates the display unit such that either the first region or the second region, which contains high-priority information, is larger than the other. If prescribed conditions occur, the first control means operates the display unit such that the region containing low-priority information is larger than the other.

2 Claims, 5 Drawing Sheets

(51) Int. Cl.
  *G09G 5/12* (2006.01)
  *G06T 3/40* (2006.01)
  *G01C 21/36* (2006.01)
  *G06F 3/048* (2013.01)

(52) U.S. Cl.
  CPC ......... *G01C 21/3697* (2013.01); *G06F 3/048* (2013.01); *G06T 3/40* (2013.01); *G09G 5/12* (2013.01); *G09G 5/14* (2013.01); *G06F 2203/04803* (2013.01); *G09G 2320/0613* (2013.01); *G09G 2320/08* (2013.01); *G09G 2340/045* (2013.01); *G09G 2380/10* (2013.01)

(58) Field of Classification Search
  CPC ......... G09G 2320/08; G09G 2340/045; G09G 2380/10; G09G 5/12; G09G 5/14
  See application file for complete search history.

(56) References Cited

U.S. PATENT DOCUMENTS 7,053,866 B1* 5/2006 Mimran ................ G02B 27/01
                                                                345/8
2005/0231529 A1* 10/2005 Skwarek ............ G01C 21/3626
                                                                345/619
2009/0015395 A1   1/2009 Rahe et al.
2013/0229417 A1*  9/2013 Brenner ................ B60K 37/02
                                                                345/440

FOREIGN PATENT DOCUMENTS

| JP | 2001-504411 A | 4/2001 |
| JP | 2008-501574 A | 1/2008 |
| JP | 2009-281991 A | 12/2009 |
| JP | 2011-166290 A | 8/2011 |
| JP | 2012-128620 A | 7/2012 |
| WO | 2011049070 A1 | 4/2011 |

OTHER PUBLICATIONS

International Search Report PCT/JP2014/050932 dated Feb. 10, 2014 with English translation.

* cited by examiner

INFORMATION PROVISION DEVICE FOR VEHICLE

CROSS-REFERENCE TO RELATED APPLICATIONS

This Application is the U.S. National Phase of PCT/JP2014/050932 filed Jan. 20, 2014, which claims priority to Japanese Patent Application No. 2013-018120 filed Feb. 1, 2013. The subject matter of each is incorporated herein by reference in entirety.

TECHNICAL FIELD

The present invention relates to an information provision device for vehicle configured to present various items of information to a vehicle user and, specifically, to an information provision device for vehicle configured to present various items of information by using an onboard device and an external device.

BACKGROUND ART

As an information provision device for vehicle such as an in-car information system, for example, Patent Literature 1 discloses a configuration in which a portable information device (external device) and an onboard multimedia computer with a liquid crystal display (onboard device) mounted on a vehicle are connected to each other and are controllable with respect to each other. With this configuration, an external information of the vehicle that the portable information device has (audio player, navigation system, internet browser) can be displayed to a vehicle user via a display (display unit) provided on an onboard multimedia computer.

CITATION LIST

Patent Literature

PTL 1: JP-A-2001-22482

SUMMARY OF INVENTION

Technical Problem

The information provision device for vehicle described in the above-described Patent Literature 1 provides an in-car information system (information provision device for vehicle) which allows usage of a portable information device readily in a vehicle, and providing a vehicle user with high convenience. When presenting the external information (the external information of the vehicle) that the portable information device has to the vehicle user not by a specific display, but by using an existing display, there is a room for improvement regarding a method of displaying the external information.

In particular, supposing that there is an indicator display (display unit) provided with the existing display on a vehicle indicator (onboard device), the indicator display normally displays vehicle state information such as a traveling speed of the vehicle or the like, and in the case of additionally displaying the external information that the portable information device has in the indicator display in which the vehicle state information is already displayed, a display region in the indicator display is not sufficient. Therefore, a reduction in display size of various items of information to be displayed (the term "various items of information" here means information including the vehicle state information and the external information) (that is, a change of a display layout) is required.

However, if the display size of the various items of information displayed on the indicator display is reduced, it is anticipated that the vehicle user who is driving the vehicle while viewing the various items of information may be puzzled (feel a sense of discomfort) or visibility of the user who watches the various items of information may be deteriorated. Therefore, it cannot be said that adequate second display region is provided for the user and, in this point, there is a room for further improvement.

Therefore, focusing on a point of improvement described above, it is an object of the present invention to provide an information provision device for vehicle capable of realizing information provision to a user more adequately in the case of presenting external information that an external device has to the vehicle user via a display unit provided on the onboard device.

Solution to Problem

The present invention includes an onboard device having a display unit configured to display various states of a vehicle to a user as vehicle state information and first control means configured to activate the display unit; and an external device having second control means connected to the onboard device via connecting means and configured to output external information of the vehicle to the first control means, and characterized in that the display unit includes: a first display region configured to display the vehicle state information; and a second display region configured to display the external information of the vehicle, in that the first control means has a function to determine priority between the vehicle state information and the external information of the vehicle, and cause the display unit to be operated so that at least one of the first display region and the second display region which includes information having higher priority becomes larger than the other display region and, if a predetermined condition is met, controls the display unit to operate so that the display region including the information having lower priority becomes larger than the other display region.

A present invention includes an onboard device having a display unit configured to display various states of a vehicle to a user as vehicle state information and first control means configured to activate the display unit; and an external device having second control means connected to the onboard device via the connecting means and configured to output external information of the vehicle to the first control means, and characterized in that the display unit includes: a first display region configured to display the vehicle state information; and a second display region configured to display the external information of the vehicle, in that the first control means has a function to determine priority between the vehicle state information and the external information of the vehicle, and controls the display unit to operate so that a display surface area of the first display region and a display surface area of the second display region depending on whether or not a predetermined condition is met and the priority.

The present invention is also characterized in that the first control means determines whether or not the predetermined condition is met on the basis of vehicle speed information which indicates a vehicle traveling speed included in the vehicle state information or operation information output from an operating device by an operation of the operating device by the user.

The present invention is also characterized in that the onboard device is capable of receiving telephone call or e-mail incoming information as the external information of the vehicle from the external device side via the connecting means, and the first control means operates the display unit to display at least one of the incoming information and the alarm information in the second display region so as to intrude thereon upon detection of at least one of the incoming information and the alarm information.

Advantageous Effects of Invention

The present invention is capable of providing an information provision device for vehicle capable of realizing information provision to a user more adequately in the case where external information that an external device has is presented to the vehicle user via a display unit provided on the onboard device.

DESCRIPTION OF EMBODIMENTS

First Embodiment

Referring now to FIG. 1 to FIG. 6, a first embodiment of the present invention will be described.

Figure 1:
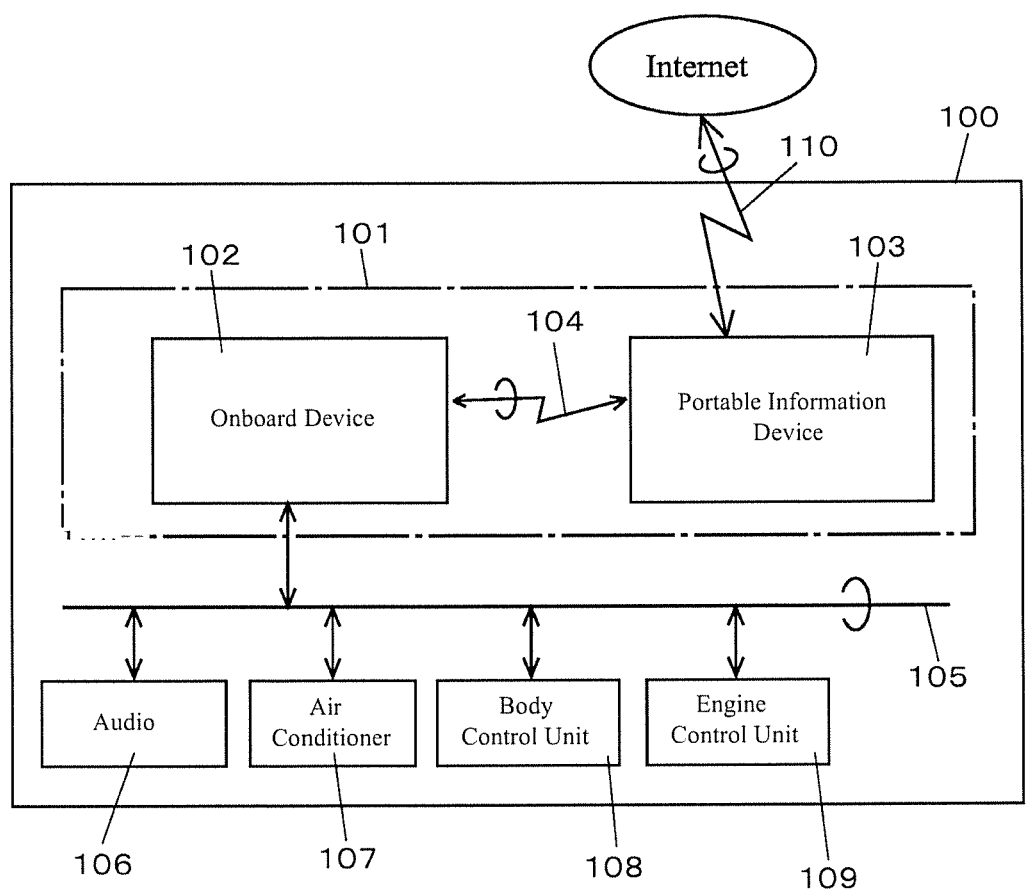
FIG. 1 is a block diagram illustrating an information provision device for vehicle and a connecting state of various electric components according to a first embodiment of the present invention.

FIG. 1 is a block diagram showing an embodiment of the present invention. In FIG. 1, reference numeral 100 denotes a vehicle. Reference numeral 101 denotes an information provision device for vehicle, and the information provision device for vehicle 101 includes an onboard device (here, vehicle indicator) 102, an external device as a portable information device (here, smart phone) 103, and connecting means 104 configured to connect the onboard device 102 and the external device 103.

The onboard device 102 is connected to electric components such as an audio 106, an air conditioner 107, a body control unit 108, an engine control unit 109, and the like via an onboard LAN (multiple communication line) 105. The external device 103 connected to the onboard device 102 via the connecting means 104 may also be connected to internet via communication means 110.

Figure 2:
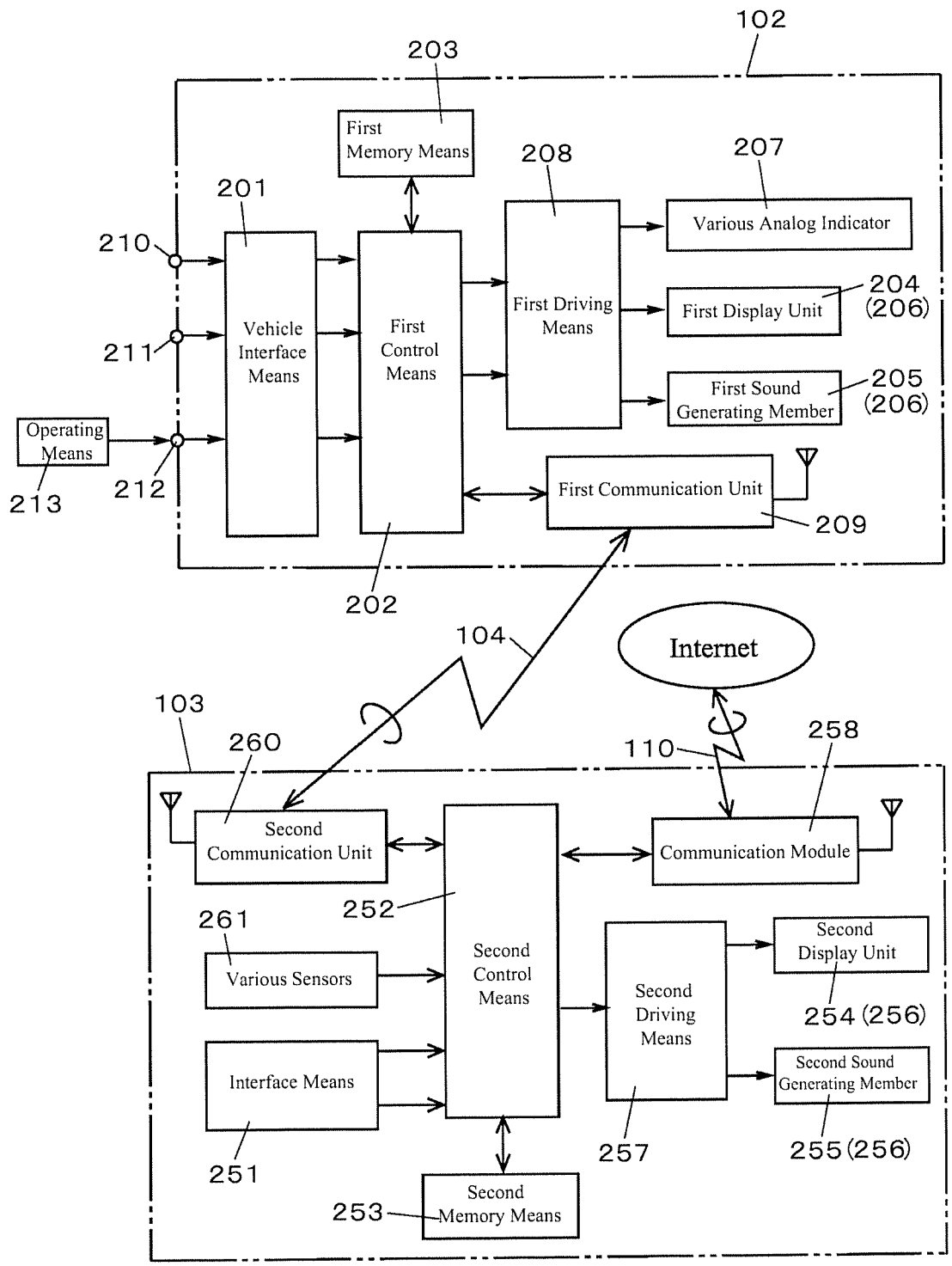
FIG. 2 is a block diagram of the information provision device for vehicle according to the same embodiment.

Subsequently, a configuration of the information provision device for vehicle 101 which mainly includes the onboard device 102 and the external device 103 will be described with reference to FIG. 2. The onboard device 102 includes a vehicle information terminal (vehicle information means) 210 and a multiple communication I/O terminal (multiple communication I/O means) 211 configured to input and output various items of information (vehicle state signal) regarding various states of the vehicle; a operation information terminal 212 capable of input an operation instruction signal (for example, a display mode switching signal described later, for example) from predetermined operating means 213, vehicle interface (vehicle I/F) means 201; first control means 202 composed of a microcomputer, for example, configured to perform control of the onboard device 102; first memory means 203 including a flush memory in which a processing program of the first control means 202 is to be stored and a non-volatile memory such as a EEPROM and the like; first notifying means 206 including a first display unit (display unit) 204 such as a liquid crystal display panel and an organic EL panel configured to visually notify various items of information (various states of the vehicle) to the vehicle user and a first sound generating member 205 such as a speaker configured to acoustically notify various items of information (various state of the vehicle) to the vehicle user; first driving means 208 configured to control driving of both of the first display unit 204 and the first sound generating member 205 and various analog (indicating needle type) indicator 207; and a first communication unit (here, Bluetooth (registered tread mark) 209 as a wireless communication device which constitute the connecting means 104 configured to connect the external device 103.

Here, the first sound generating member 205 may be a helmet speaker provided in a helmet that a rider (user) who ride a motorcycle when the vehicle is the motor cycle. Although detailed illustration is omitted, the various types of analog indicator 207 includes at least one of a speed meter configured to indicate a vehicle speed in an analog fashion, a tachometer configured to indicate the number of revolution of an engine of the vehicle in an analog fashion, a fuel meter configured to indicate an amount of fuel in a tank in an analog fashion, and a temperature meter configured to display a temperature of an engine cooling water in an analog fashion.

A first communication unit 209 is configured to perform a wireless communication with a second communication unit described later provided on the external device 103. In other words, the first communication unit 209 is capable of transferring data with the second communication unit provided on the external device 103.

The operating means 213 includes an operation input unit for performing various operations of the onboard device 102, for example, an operation input unit of substantially cross-shaped key type having a cursor button, an enter button, and the like installed at an adequate position in the car so that the user can reach with his/her hand may be applied, and operating information (the operation instruction signal described above) output from the operating means 213 by the operation of the operating means 213 by the user is input to the first control means 202 through the operation information terminal 212 and the vehicle interface means

201. A touch-panel type operation input unit may be applied instead of the above-described cross-key type operation input unit as the operating means 213.

The external device 103 includes: a second communication unit (here, Bluetooth (registered tread mark)) 260 as a wireless communication device which constitute the connecting means 104 configured to connect with the onboard device 102; various sensors (here, GPS module) 261; interface (I/F) means 251; second control means 252 composed of a microcomputer, for example, configured to perform control of the external device 103; second memory means 253 including a flush memory in which a processing program of the second control means 252 is to be stored and a non-volatile memory such as a EEPROM and the like; second notifying means 256 including a second display unit 254 such as a display with a touch panel configured to visually notify various items of information (various states of the vehicle) to the vehicle user and a second sound generating member 255 such as a speaker configured to acoustically notify various items of information (various state of the vehicle) to the vehicle user; second driving means 257 configured to control driving of both of the second display unit 254 and second sound generating member 255; and a communication module 258 configured to constitute the communication means 110 for connecting with the internet.

In this embodiment, the first and second communication units 209 and 260 composed of wireless communication means are applied to the onboard device 102 and the connecting means 104 of the external device 103. However, the invention is not limited thereto, and the onboard device 102 and the external device 103 may be connected by using the connecting means 104 composed of a wired communication device such as an USB.

In this embodiment, the first communication unit 209 is provided in the onboard device 102. However, the invention is not limited thereto, and for example, a configuration in which gate way (G/W) means, which is not illustrated, to be connected to the onboard LAN 105 is provided and the first communication unit 209 is integrated in the gateway means, thereby connecting the onboard device 102 and the external device 103 is also applicable.

Subsequently, a display layout displayed on the first display unit 204 when the first control means 202 provided on the onboard device 102 executes first to third display mode, described later, will be described with reference to FIG. 3 to FIG. 6.

Figure 3:
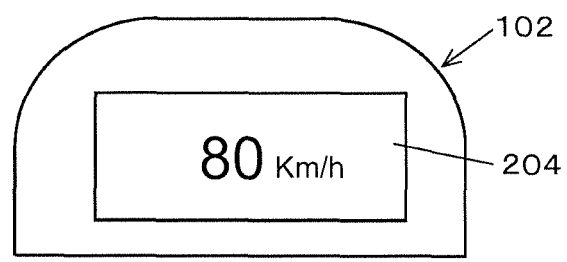
FIG. 3 is a bird' eye view illustrating an example of an onboard device of the same embodiment.

Here, the onboard device 102 as the vehicle indicator is provided with the first display unit 204 formed of the liquid crystal display panel as illustrated in FIG. 3, and the first display unit 204 is formed of a display for indicators which display various states of the vehicle to the vehicle user as the vehicle state information.

Figure 4:
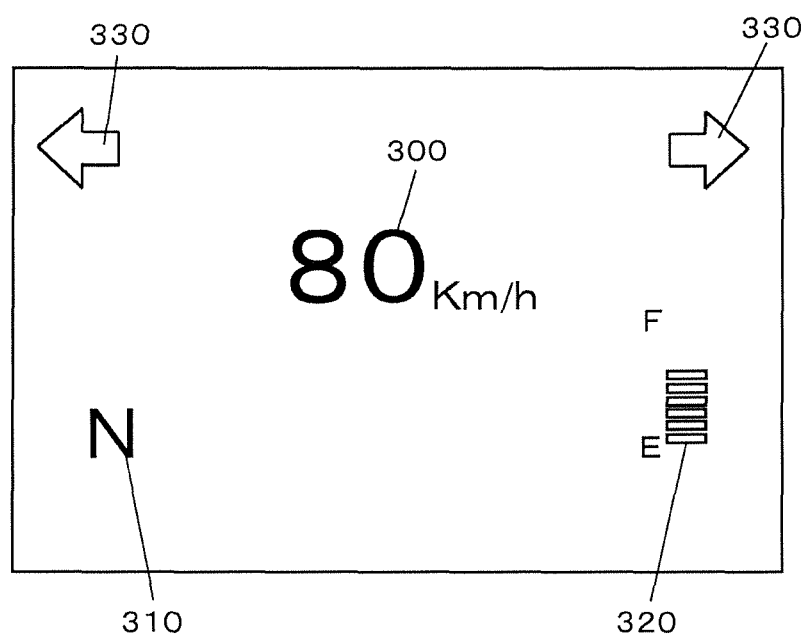
FIG. 4 is a drawing illustrating a display layout of a display unit by a first display mode (normal display mode) of the same embodiment.

The first control means 202 receives the vehicle state signal via the multiple communication I/O terminal 211 (or the vehicle information terminal 210), and controls the first display unit 204 to perform a display operation for causing the first display unit 204 to display the vehicle state information corresponding to a first display mode (normal display mode) M1 as illustrated in FIG. 4 on the basis of the vehicle state signal.

In the first display mode M1 in which the external information of the vehicle is not displayed at all and only the vehicle state information is displayed on the first display unit 204 described later, the first control means 202 performs control the first display unit 204 to perform a display operation in order to display a vehicle-speed display unit 300 configured to display a traveling speed of the vehicle as the vehicle state information, a shift position display unit 310 configured to display a shift position, a fuel remaining amount display unit 320 configured to display a remaining amount of fuel, and a direction indication display unit 330 configured to display a direction of travel of the vehicle on the first display unit 204.

In the first display mode M1, the vehicle-speed display unit 300 is displayed at a substantially center of the first display unit 204, the shift position display unit 310 is displayed on a lower left of the first display unit 204, the fuel remaining amount display unit 320 is displayed on the lower right of the first display unit 204, and the direction indication display unit 330 is displayed on the upper left and the upper right of the first display unit 204.

Subsequently, a display layout displayed on the first display unit 204 when the first control means 202 executes a second display mode (external information display mode) M2 different from the first display mode (normal display mode) M1 will be described.

At the time of executing the second display mode M2, the first control means 202 receives the vehicle state signal via the multiple communication I/O terminal 211 (or the vehicle information terminal 210) and, simultaneously, receives the external information of the vehicle (here, it is navigation information, but may be, for example, music information) via the respective communication units 260 and 209 from the external device 103 side.

Figure 5:
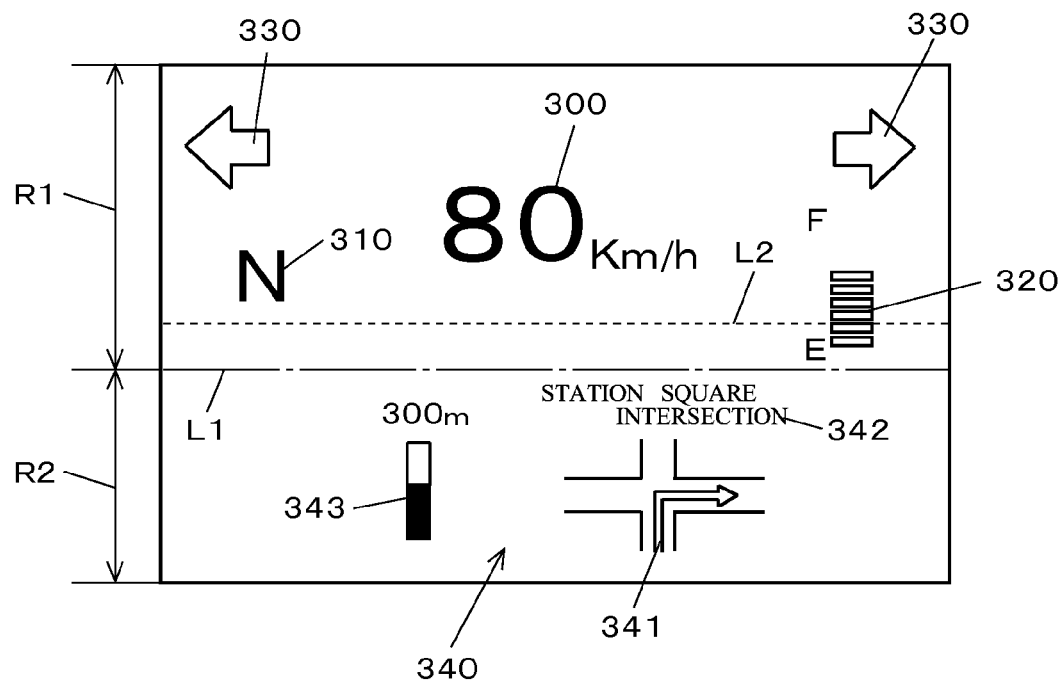
FIG. 5 is a drawing illustrating a display layout of a display unit in a second display mode (external device display mode) of the same embodiment.

Here, the first control means 202 has a function to determine priority between the vehicle state signal (the vehicle state information) and the navigation information by using a vehicle speed signal (that is, the vehicle speed information) indicating the traveling speed of the vehicle out of the vehicle state signal, and determines that the vehicle state signal (vehicle state information) has a higher priority than the navigation information during the vehicle travel, that is, when the vehicle is traveling, and controls the first display unit 204 to perform a display operation for displaying display information corresponding to the second display mode (external information display mode) M2 as illustrated in FIG. 5 in the first display unit 204 on the basis of the vehicle state signal or the navigation information.

In other words, in the second display mode M2, the first control means 202 controls the first display unit 204 to perform the display operation for displaying the vehicle-speed display unit 300 displayed already in the first display mode M1, the shift position display unit 310, the fuel remaining amount display unit 320, and the direction indication display unit 330 in a first display region R1 which is an upper side in the first display unit 204 in FIG. 5.

At this time, the second control means 252 provided on the external device 103 outputs navigation information to the first control means 202 via the connecting means 104 (communication units 260 and 209), and the first control means 202 controls the first display unit 204 to perform the display operation for displaying navigation display unit 340 (external information of the vehicle) in a second display region R2, which is a lower side in the first display unit 204 in FIG. 5.

Here, the navigation display unit 340 performs a turn-by-turn display including an arrow indication 341, an intersection name display 342, and a remaining distance display 343 to an intersecting point. A map display may be applied to the navigation display unit 340 instead of the turn-by-turn display.

In the second display mode M2, the first display unit 204 includes the first display region R1 and the second display region R2 divided into an upper part and a lower part, and at this time, since the first control means 202 determines that the vehicle state information has a higher priority than the navigation information as described above, a border line L1 (an alternate long and short dash line portion in FIG. 5) which indicates a border between the first display region R1 and the second display region R2 is positioned on a lower side than a center line L2 (dot line portion in FIG. 5) which divide the first display unit 204 into two upper and lower parts.

Therefore, in the second display mode M2, the first control means 202 controls the first display unit 204 to perform the display operation so that a display region including information having higher priority from between the first display region R1 and the second display region R2 (that is, the first display region R1 in which the vehicle-speed display unit 300, the shift position display unit 310, the fuel remaining amount display unit 320, and the direction indication display unit 330 are displayed) becomes larger than the other display region (that is, the second display region R2 in which the navigation display unit 340 is displayed).

In other words, at the time of execution of the second display mode M2, the display surface area of the first display region R1 including the vehicle state information (a vehicle-speed display unit 300, a shift position display unit 310, a fuel remaining amount display unit 320, and a direction indication display unit 330) which is determined to have higher priority is configured to be larger (wider) than the surface area of the second display region R2 including the navigation display unit 340 which is determined to have lower priority.

Therefore, a display size of characters and symbol marks of the vehicle state information (the vehicle-speed display unit 300, the shift position display unit 310, fuel remaining amount display unit 320, and the direction indication display unit 330) to be displayed in the first display region R1 may be substantially the same as a display size in the first display mode M1. In contrast, when comparing with the display surface area of the vehicle state information at this time, the display size of the characters and the symbol marks of the navigation display unit 340 (the arrow indication 341, the intersection name display 342, and the remaining distance display 343 to the intersecting point) to be displayed in the second display region R2 which has a rather smaller display surface area becomes small.

Subsequently, a display layout of the first display unit 204 when the first control means 202 receives the display mode switching signal output from the operating means 213 in association with an operation of the operating means 213 by the user during execution of the second display mode M2 illustrated in FIG. 5 will be described on the basis of FIG. 6.

The first control means 202 receives the vehicle state signal via the multiple communication I/O terminal 211 (or the vehicle information terminal 210) and, simultaneously, receives the external information of the vehicle (here, it is navigation information) via the respective communication units 260 and 209 from the external device 103 side in the same manner as the case of the second display mode M2.

Figure 6:
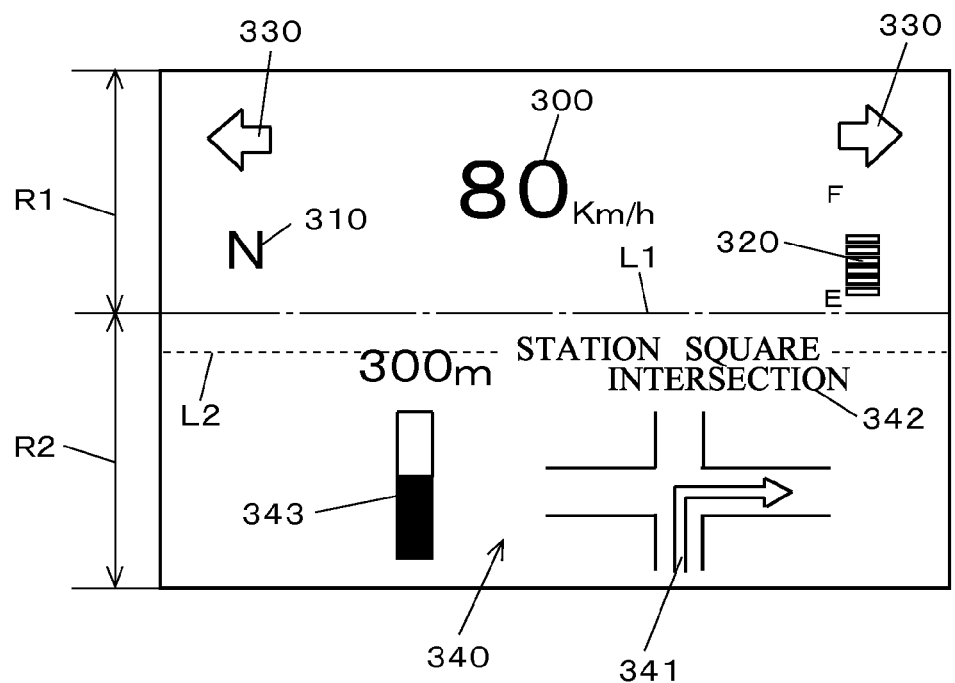
FIG. 6 is a drawing illustrating a display layout of the display unit in a third display mode (another external device display mode) of the same embodiment.

When a predetermined condition is met (for example, when the display mode switching signal indicating that the display mode is switched), the first control means 202 controls the first display unit 204 to perform a display operation for displaying the display information corresponding to a third display mode (another external information display mode) M3 as illustrated in FIG. 6 on the basis of the vehicle state signal and the navigation information. In other words, in this case, the first control means 202 has a function to determine whether or not the predetermined condition is met on the basis of the display mode switching signal as the operation information.

When executing the third display mode M3, the first control means 202 controls the first display unit 204 to perform a display operation for displaying the vehicle state information (the vehicle-speed display unit 300, the shift position display unit 310, fuel remaining amount display unit 320, and the direction indication display unit 330) on the first display region R1 located on the upper side of the border line L1 in a state in which the border line L1 is located on the upper side of the center line L2 as illustrated in FIG. 6, and displaying the navigation display unit 340 in the second display region R2 located on the lower side of the border line L1 in a state in which the border line L1 is located on the upper side of the center line L2.

Therefore, in the third display mode M3, the first control means 202 controls the first display unit 204 to perform the display operation so that a display region including information determined to have lower priority at the time of executing the second display mode M2 (that is, the second display region R2 on which the navigation display unit 340 is displayed) becomes wider than the other display region (that is, the first display region R1 on which the vehicle-speed display unit 300, the shift position display unit 310, the fuel remaining amount display unit 320, and the direction indication display unit 330 are displayed) when the predetermined condition is met.

More specifically, at this time, the first control means 202 makes the display surface area of the display region including information having high priority (that is, the first display region R1) out of the first display region R1 and the second display region R2 larger when the predetermined condition is not met than that when the predetermined condition is met and, in contrast, controls the first display unit 204 to perform a display operation so that the display surface area of the other display region including information having lower priority (that is the second display region R2) larger when the predetermined condition is met than that when the predetermined condition is not met. In other words, it means that the first control means 202 controls the first display unit 204 to perform a display operation so that the display surface area of the first display region R1 and the display surface area of the second display region R2 are determined depending on whether or not the predetermined condition is generated and the priority.

In other words, when executing the third display mode M3, the display surface area of the second display region R2 including the navigation display unit 340 which is determined to have low priority at the time of execution of the second display mode M2 is configured to be larger (wider) than the display surface area of the first display region R1 including the vehicle state information (the vehicle-speed display unit 300, the shift position display unit 310, fuel remaining amount display unit 320, and the direction indication display unit 330) which is determined to have high priority at the time of execution of the second display mode M2.

Therefore, the display size of the characters and the symbol marks of the navigation display unit 340 (the arrow indication 341, the intersection name display 342, and the remaining distance display 343 to the intersecting point) to be displayed in the second display region R2 may be larger than the display size in the second display mode M2 described above. In contrast, when comparing with the display surface area of the navigation display unit 340 at that time, the display size of the characters and the symbol marks of the vehicle state information (the vehicle-speed display unit 300, the shift position display unit 310, fuel remaining amount display unit 320, and the direction indication display unit 330) displayed in the first display region R1 having a rather small display surface area is smaller than the display side of the first display mode M1 (or the second display mode M2) described above.

In the case of where the first control means 202 receives the display mode switching signal again at the time of execution of the third display mode M3, the first control means 202 may control the first display unit 204 to perform a display operation so that the information is displayed in the second display mode instead of the third display mode M3 in the first display unit 204. This means that the second display mode M2 and the third display mode M3 can be switched by an operation of the operating means 213 by the user.

According to the embodiment as described above, the first control means 202 has a function to determine priority between the vehicle state information and the external information (navigation display unit 340) of the vehicle, controls the first display unit 204 to operate so that the first display region including the information having high priority out of the first display region R1 and the second display region R2 (the first display region R1 in which the vehicle state information is displayed) becomes wider than the other display region (the second display region R2 in which the navigation display unit 340 is displayed), and when the predetermined condition is met (upon reception of the display mode switching signal), controls the first display unit 204 to operate so that the display region including the information having low priority (the second display region R2 in which the navigation display unit 340 is displayed) becomes wider than the other display region (first display region R1 in which the vehicle state information is displayed). The first control means 202 determines whether or not the predetermined condition is met or not on the basis of the display mode switching signal as the operation information output from the operating means 213 by an operation of the operating means 213 by the user.

Therefore, in the second display mode (external information display mode) M2 like during the travel of the vehicle, since the display surface area of the first display region R1 in which the vehicle state information (the vehicle-speed display unit 300, the shift position display unit 310, fuel remaining amount display unit 320, and the direction indication display unit 330) is displayed is set to be wider (larger) than the display surface area of the second display region R2 in which the navigation display unit 340 is displayed, the display size of characters and the symbol mark of the vehicle state information, which is the information having high priority becomes substantially same as the display side in the first display mode M1, whereby further adequate information provision to the user with the vehicle state added thereto is realized.

Furthermore, since the display size of the characters and the symbol marks of the navigation display unit 340, which has been rather smaller in the second display mode M2, becomes larger in the third display mode M3 when the display is switched from the second display mode M2 to the third display mode (the other external device display mode) M3 by using the operation information (the display mode switching signal), visibility of the navigation display unit 340 is sufficiently secured, and further adequate information provision to the user is enabled.

In this embodiment, the example in which the first control means 202 controls the first display unit 204 to perform a display operation for displaying the display information corresponding to the third display mode M3 in the first display unit 204 instead of the second display mode M2 when the predetermined condition is matched (upon reception of the display mode switching signal) has been described. However, the first control means 202 may be configured to control the first display unit 204 to perform a display operation for displaying the display information corresponding to the third display mode M3 in the first display unit 204 instead of the second display mode M2 when the first control means 202 receives a signal (vehicle speed information) indicating that the traveling speed of the vehicle is 0 km/h (that is, the vehicle is stopped) by using the vehicle speed information indicating the traveling speed of the vehicle included in the vehicle state information.

In other words, in this case, the first control means 202 determines whether or not the predetermined conditions is met on the basis of the vehicle speed information included in the vehicle state information. The first control means 202 is configured to cause the information displayed in the first display unit 204 is switched from the second display mode M2 to the third display mode M3 upon reception of the display mode switching signal. However, a configuration in which the mode is switched from the second display mode M2 to the third display mode M3 after an elapse of a predetermined time from the execution of the third display mode M3, for example, is also applicable, and a configuration in which the mode is switched to the second display mode M2 when the vehicle start switch (ignition switch) is changed from an ON state to an OFF state during the execution of the third display mode M3 is also applicable.

Second Embodiment

Subsequently, a second embodiment of the present invention will be described on the basis of FIG. 7. However, the same or corresponding parts as those of the first embodiment described above are designated by the same reference numerals and detailed description thereof is omitted.

The second embodiment is different from the first embodiment in that at the time of execution of the third display mode M3, the first control means 202 has a function to determine whether or not various types of (predetermined) alarm information (here, it is assumed to be a trunk OPEN signal which indicates a trunk on the rear of the vehicle is OPEN as reminder information) are generated, and when the alarm information (reminder information) is determined to be generated, controls the first display unit 204 to perform a display operation so that display of part of the navigation display unit 340 displayed in the second display region R2 is switched to an alarm display unit 350 as the alarm information.

Figure 7:
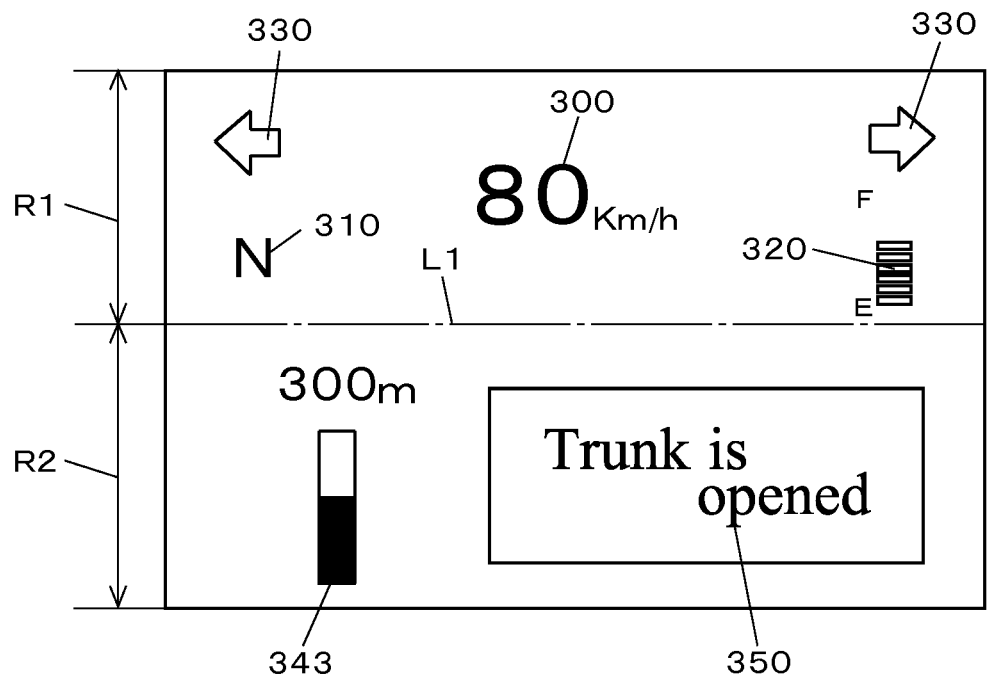
FIG. 7 is a drawing illustrating the display layout of the display unit when a first control means receives alarm information according to a second embodiment of the invention.

FIG. 7 illustrates a display example of the third display mode M3 displayed so that the alarm display unit 350 intrudes part (at least part) of the navigation display unit 340. Here, when the first control means 202 determines that the alarm information is generated, the first control means 202 controls the first display unit 204 to perform a display operation so that display of part of the navigation display unit 340 displayed in the second display region R2 is switched to the alarm display unit 350.

Specifically, in the first display unit 204, the arrow indication 341 and the intersection name display 342 which have been displayed in the second display region R2 thus far are brought into a non-display state, and the alarm display unit 350 saying "the trunk is open" is displayed at a position where the arrow indication 341 and the intersection name display 342 are displayed so as to intrude thereon. Subsequently, when the first control means 202 receives a trunk CLOSED signal indicating that the trunk is closed, the first control means 202 control the first display unit 204 to perform a display operation for returning the first display unit 204 back to a display layout illustrated in FIG. 6 on the basis of the trunk CLOSED signal (that is, for not displaying the alarm display unit 350 and displaying the arrow indication 341 and the intersection name display 342 again).

Figure 8:
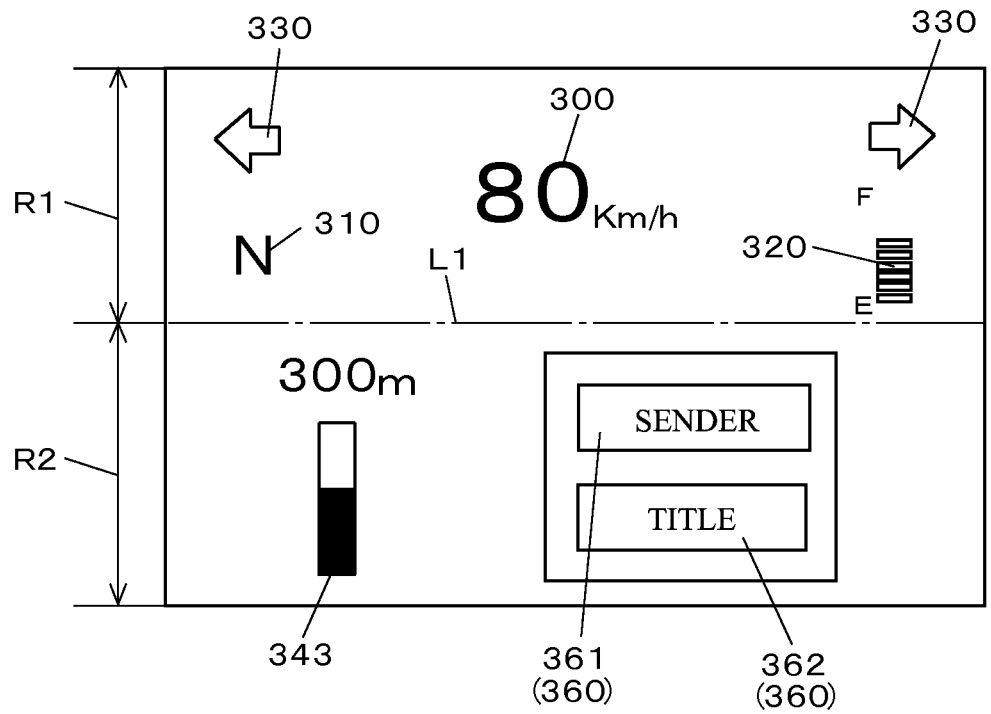
FIG. 8 is a drawing illustrating a display layout of the display unit when the first control means receives incoming call information according to a modification of the same second embodiment.

In the second embodiment, the example in which the alarm display unit 350 is displayed in part of the navigation display unit 340 so as to intrude thereon in the third display mode M3 has been described. However, for example, a configuration in which telephone call or e-mail incoming information 360 is displayed so as to intrude part of the navigation display unit 340 instead of the alarm display unit 350 in the third display mode M3 as illustrated in FIG. 8 as a modification of the second embodiment.

In this case, the second control means 252 provided on the external device 103 outputs the telephone call or e-mail incoming information to the first control means 202 via the connecting means 104 (the communication units 260 and 209) and, in association therewith, the onboard device 102 is allowed to receive the telephone call or e-mail incoming information as the vehicle external information from the external device 103 side via the connecting means 104.

In the case where the first control means 202 determines that the incoming call information (here, it is assumed to be the e-mail incoming information) is generated as the external information of the vehicle, the first control means 202 controls the first display unit 204 to perform a display operation so that display of part of the navigation display unit 340 displayed in the second display region R2 is switched to the incoming call display unit (notification display unit) 360 as the incoming call information.

Specifically, in the first display unit 204, the arrow indication 341 and the intersection name display 342 which have been displayed in the second display region R2 thus far are brought into a non-display state, and the incoming call display unit 360 including a sender display 361 and a title display 362, for example is displayed at a position where the arrow indication 341 and the intersection name display 342 are displayed so as to intrude thereon. Subsequently, when the first control means 202 control the first display unit 204 to perform a display operation for returning the first display unit 204 back to a display layout illustrated in FIG. 6 (that is, for not displaying the incoming call display unit 360 and displaying the arrow indication 341 and the intersection name display 342 again) upon reception of the operation information that indicates that the user has performed a confirmation operation for incoming of the e-mail.

According to the second embodiment, when the first control means 202 detects one of the incoming call information (the incoming call display unit 360) and the alarm information (the alarm display unit 350), the first control means 202 controls the first display unit 204 to perform a display operation for displaying one of them in the second display region R2 so as to intrude thereon, so that a further adequate information provision to the user is realized. In addition, since the provision of an area specific for displaying the incoming call information or for displaying the alarm information is no longer necessary for displaying the incoming call information and the alarm information which occur at rather low frequency in the first display unit 204, there is a merit that the first display unit 204 can be reduced in size.

In addition, in the second embodiment, the example in which one of the incoming call information (incoming call display unit 360) and the alarm information (alarm display unit 350) is displayed in the second display region R2 so as to intrude thereon has been described. However, both of the incoming call information and the alarm information may be displayed in the second display region R2 so as to intrude thereon. In other words, in the case of the present invention, the first control means 202 is configured to control the first display unit 204 to perform a display operation so as to display at least one of the incoming call information and the alarm information in the second display region R2 so as to intrude thereon upon detection thereof.

In the second embodiment, the example in which the incoming call information (the incoming call display unit 360) or the alarm information (alarm display unit 350) is displayed so as to intrude thereon in the third display mode M3 as the other external device display mode illustrated in FIG. 6 has been described. However, for example, a configuration in which at least one of the incoming call information (the incoming call display unit 360) and the alarm information (the alarm display unit 350) is displayed in the second display region R2 in the second display mode M2 as the external device display mode illustrated in FIG. 5 so as to intrude thereon is also applicable.

INDUSTRIAL APPLICABILITY

The present invention relates to an information provision device for vehicle in which an onboard device and an external device are used, and may be applied as the onboard device not only to vehicle meters (vehicle indicators) configured to display vehicle information, but also to a navigation system or a multi-display apparatus to be mounted on the vehicle.

REFERENCE SIGNS LIST 101 information provision device for vehicle
102 onboard device
103 external device
104 connecting means
202 first control means
204 first display unit (display unit)
209 first communication unit
213 operating device
252 second control means
260 second communication unit
300 vehicle-speed display unit
310 shift position display unit
320 fuel remaining amount display unit
330 direction indication display unit
340 navigation display unit (external information of vehicle)
341 arrow indication
342 intersection name display
343 remaining distance display
350 alarm display unit
360 incoming call display unit
L1 border line
L2 center line
M1 first display mode (normal display mode)
M2 second display mode (external device display mode)
M3 third display mode (another external device display mode)
R1 first display region
R2 second display region

The invention claimed is:

1. An information provision device for vehicle comprising:
- an onboard device having a display unit configured to display various states of a vehicle to a user as vehicle state information and first microcomputer configured to activate the display unit; and
- an external device having second microcomputer connected to the onboard device via connecting means and configured to output external information of the vehicle to the first microcomputer, wherein the display unit includes:
- a first display region configured to display the vehicle state information, and
- a second display region configured to display the external information of the vehicle, and the first microcomputer is configured to:
- determine priority between the vehicle state information and the external information of the vehicle;
- if a predetermined condition is not met, control the display unit to operate so that a display region of the first display region and the second display region with the information determined to have higher priority has a larger area than the other display region of the first display region and the second display region, and
- if the predetermined condition is met, control the display unit to operate so that:
  - the other display region has a larger area than the display region with the information determined to have higher priority, and
- when the predetermined condition is met, control the display unit to operate so that:
  - display size of information displayed on the other display region is larger than before occurrence of the predetermined condition, and
  - display size of information displayed on the display region with information determined to have higher priority is smaller than before occurrence of the predetermined condition, wherein the first microcomputer determines whether or not the predetermined condition is met on the basis of vehicle speed information which indicates a vehicle traveling speed included in the vehicle state information.

2. The information provision device for vehicle according to claim 1, wherein
- the onboard device is capable of receiving telephone call or e-mail incoming information as the external information of the vehicle from the external device side via the connecting means, and
- the first microcomputer operates the display unit to display at least one of the incoming information and warning information in the second display region so as to intrude thereon upon detection of at least one of the incoming information and the warning information.

* * * * *